US009838263B2

(12) United States Patent
Eliassaf et al.

(10) Patent No.: US 9,838,263 B2
(45) Date of Patent: Dec. 5, 2017

(54) IDENTIFYING A POLLING COMMUNICATION PATTERN

(75) Inventors: Ofer Eliassaf, Modin (IL); Amir Kessner, Ramat-Gan (IL); Meidan Zemer, Hod-Hasharon (IL); Oded Keret, Tel Aviv (IL); Leonid Pekel, Petah Tiqva (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 394 days.

(21) Appl. No.: 14/373,595

(22) PCT Filed: Jan. 23, 2012

(86) PCT No.: PCT/US2012/022249
§ 371 (c)(1),
(2), (4) Date: Jul. 21, 2014

(87) PCT Pub. No.: WO2013/112132
PCT Pub. Date: Aug. 1, 2013

(65) Prior Publication Data
US 2014/0372590 A1    Dec. 18, 2014

(51) Int. Cl.
*H04L 12/24* (2006.01)
*H04L 29/08* (2006.01)
*H04L 12/26* (2006.01)

(52) U.S. Cl.
CPC ............ *H04L 41/145* (2013.01); *H04L 43/50* (2013.01); *H04L 67/02* (2013.01); *H04L 67/2833* (2013.01); *H04L 43/026* (2013.01)

(58) Field of Classification Search
CPC ...................................................... H04L 41/145

USPC .......................................................... 709/223
See application file for complete search history.

(56) References Cited

U.S. PATENT DOCUMENTS

| 5,973,609 | A  | * | 10/1999 | Schoch ................. H04J 3/1694 340/3.51 |
| 6,621,827 | B1 |   | 9/2003  | Rezvani et al. |
| 6,959,281 | B1 |   | 10/2005 | Freeling et al. |
| 7,225,249 | B1 |   | 5/2007  | Barry et al. |
| 7,788,370 | B2 | * | 8/2010  | Yugami ............... G06F 11/3447 709/223 |

(Continued)

FOREIGN PATENT DOCUMENTS

| CN | 101262405    | 9/2008  |
| CN | 101997834    | 3/2011  |
| WO | WO-2010150251 A1 | 12/2010 |

OTHER PUBLICATIONS

Ashley, D., "An Algorithm for HTTP Bot Detection," Daryl Ashley Senior Network Security Analyst University of Texas at Austin—Information Security Office Ashley@infosec.utexas.edu, Jan. 12, 2011, pp. 1-24.

(Continued)

*Primary Examiner* — David Lazaro
*Assistant Examiner* — Zia Khurshid

(57) ABSTRACT

A method for identifying a polling communication pattern within a sequence of communication entities includes grouping the communication entities into a plurality of clusters according to a criterion. Clusters are removed from the plurality according to at least one of a time pattern analysis, cluster size, and cluster duration. The clusters remaining are identified as having a polling communication pattern.

20 Claims, 3 Drawing Sheets

(56) References Cited

U.S. PATENT DOCUMENTS

| | | | |
|---|---|---|---|
| 8,028,104 B2 | 9/2011 | Meyer et al. | |
| 2003/0037145 A1* | 2/2003 | Fagan | G06Q 10/06 709/226 |
| 2007/0294392 A1 | 12/2007 | Balasubramanian et al. | |
| 2010/0083263 A1 | 4/2010 | Machida | |
| 2010/0262650 A1 | 10/2010 | Chauhan et al. | |
| 2010/0281107 A1 | 11/2010 | Fallows et al. | |

OTHER PUBLICATIONS

Extended European Search Report received in EP Application No. 12866734.2, dated Jul. 24, 2015, 6 pages.

Giroire, F. et al., "Exploiting Temporal Persistence to Detect Covert Botnet Channels," Recent Advances in Intrusion Detection, Springer Berlin Heidelberg, Sep. 23, 2009, pp. 326-345.

Wang, B. et al., "Modeling Connections Behavior for Web-based Bots Detection," e-Business and Information System Security (EBISS), 2010 2nd International Conference on, IEEE, May 22, 2010, pp. 1-4.

Korean Intellectual Property Office, International Search Report and Written Opinion, dated Oct. 29, 2012, 9 pages, Daejeon Metropolitan City, Republic of Korea.

\* cited by examiner

IDENTIFYING A POLLING COMMUNICATION PATTERN

BACKGROUND

Software tools for validating application performance can emulate hundreds or thousands of concurrent users by applying production workloads to an application platform or environment. The emulation puts the application through the rigors of real-life user loads while collecting information from key infrastructure components. Such application performance tools apply consistent, measurable, and repeatable loads to an application under test and then use resulting data to identify scalability issues that can affect real users. An application performance tool may include a virtual user generator that can run scripts to apply the loads to the application under test. To be useful, such scripts should accurately emulate the communication patterns that will be experienced by the application in production.

DRAWINGS

DETAILED DESCRIPTION

Introduction

Various embodiments described below were developed to identify polling communication patterns within a sequence of communication entities. A communication entity is a request/response pair exchanged between a client and a server. In an example, a client sends an HTTP request directed to the network address of the server, and the server communicates back to the client with an HTTP response.

Asynchronous polling communications are utilized to inform a client of the occurrence of an event on a server. The arrival of an e-mail message is just one example of such an event. Due to security concerns, the server does not initiate such a notification. Instead, the client polls the server to learn if an event occurred. Two common polling techniques are used—regular polling and long polling. With regular polling, the client periodically sends a blind request to learn if an event has occurred. The server responds to each request immediately either informing the client of the event or the absence thereof. With long polling, the client sends a request and the server waits and returns a response when the event occurs. Upon receiving a long polling response, the client sends a subsequent request to learn of a subsequent event.

Identifying polling communications over transport protocols such as HTTP has proven to be complex. All HTTP communication is based on request response round trips and not just the polling request. The URL or network address of the same communication may have varying keys and values. Furthermore, there are other asynchronous communication methods such as auto complete that can appear to be polling communications.

In an example implementation, a polling communication pattern within a sequence of communication entities is identified by grouping the communication entities into a plurality of clusters according to a criterion. For communication entities to be grouped in the same cluster, the criterion may require that the entities include at least one of an identical request method, identical request domain, and identical number of request key value pairs. Clusters are removed from consideration according to at least one of a time pattern analysis, cluster size, and cluster duration. Any clusters remaining are identified as having a polling communication pattern. This information, for example, can be used to help ensure that a load testing script is properly emulating desired polling communication patterns.

The following description is broken into sections. The first, labeled "Environment," describes and example of a network environment in which various embodiments may be implemented. The second, labeled "Components," describes examples of physical and logical components for implementing various embodiments. The third section, labeled "Operation," describes steps taken to implement various embodiments.

Environment

Figure 1:
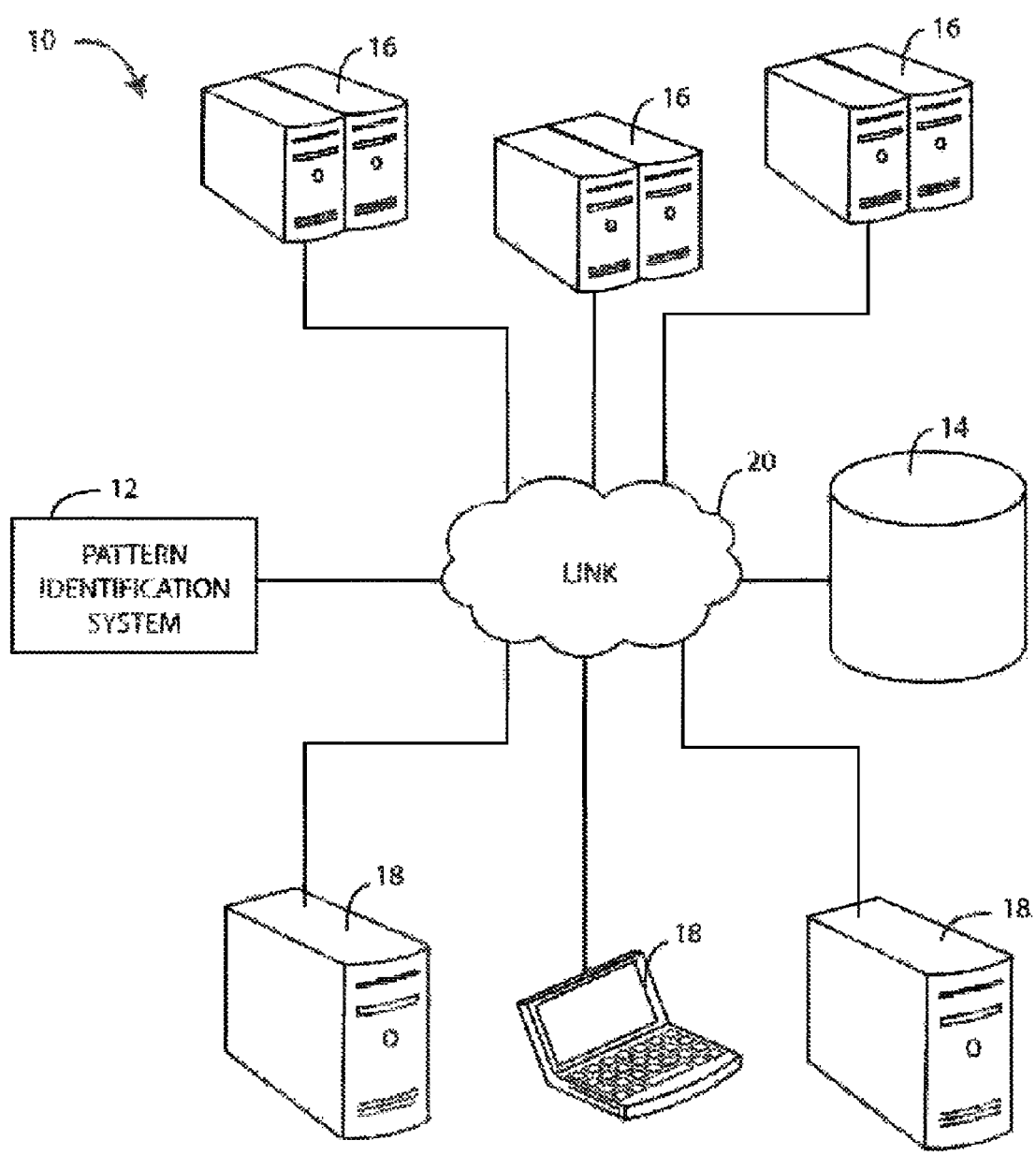
FIG. 1 depicts an environment in which various embodiments may be implemented.
Figure 2:
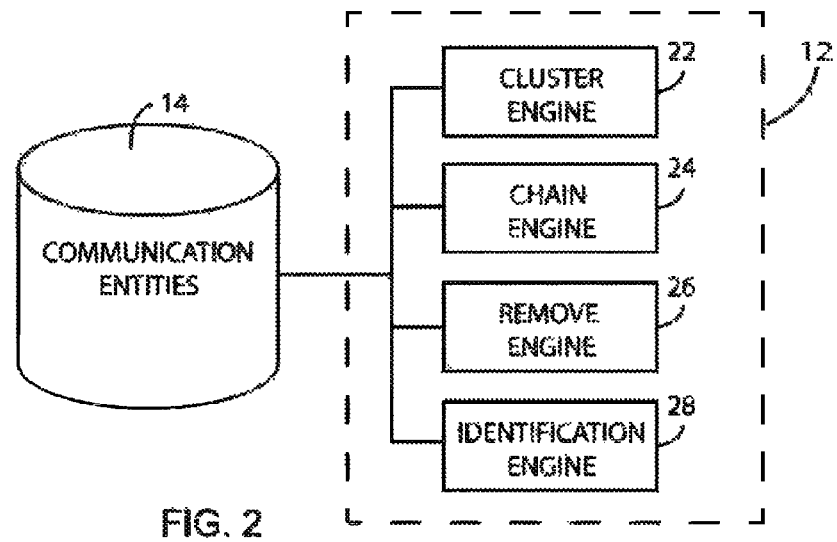
FIG. 2 depicts a system according to an example.
Figure 3:
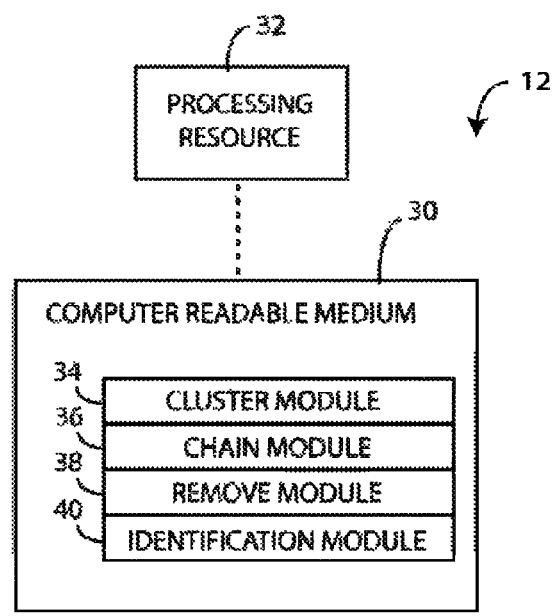
FIG. 3 is a block diagram depicting a memory and a processor according to an example.

FIG. 1 depicts an environment 10 in which various embodiments may be implemented. Environment 10 is shown to include pattern identification system 12, data store 14, server devices 16, and client devices 18. Pattern identification system 12, described below with respect to FIGS. 2 and 3, represents generally any combination of hardware and programming configured to identify a polling communication pattern within a sequence or communication entities. Data store 14 represents generally any device or combination of devices configured to store data for use by pattern identification system 12. Such data may include a sequence of recorded communications entities.

In the example of FIG. 1, the sequence of communication entities represents network communications (such as HTTP traffic) recorded over a period of time between one or more sever devices 16 and one or more client devices 18. Server devices 16 represent generally any computing devices configured to respond to network requests received from client devices 18. A given server device 16 may include a web server, an application server, or a data server. Client devices 18 represent generally any computing devices configured with browsers or other applications to communicate such requests and receive and process the corresponding responses. Link 20 represents generally one or more of a cable, wireless, fiber optic, or remote connections via a telecommunication link, an infrared link, a radio frequency link, or any other connectors or systems that provide electronic communication. Link 20 may include, at least in part, an intranet, the Internet, or a combination of both. Link 20 may also include intermediate proxies, routers, switches, load balancers, and the like.

Components

FIGS. 2-3 depict examples of physical and logical components for implementing various embodiments. FIG. 2 depicts pattern identification system 12 in communication with data store 14. Data store 14 is shown as containing a communication entity sequence for analysis by system 12. In the example of FIG. 2, system 12 includes cluster engine 22, chain engine 24, remove engine 26, and identification engine 28.

Cluster engine 22 represents generally any combination of hardware and programming configured to group the sequence of communication entities into a plurality of clusters according to a criterion. As explained, each communication entity includes a request and a corresponding response. Cluster engine 22 may operate to group selected entities into the same cluster where those entities share any of (1) an identical request method, (2) an identical request domain, and (3) an identical number of request key value pairs. Examples of request methods include GET and POST requests. Each request identifies a domain and can also include additional data and parameters being passed to the server associated with that domain. Requests that share an identical domain each refer to the same domain. The data and parameters included in a given request can include one or more key value pairs. Cluster engine 22 may group entities into the same cluster if the key value pairs of the corresponding requests differ so long as the requests include the same number of key value pairs.

Custer engine 22, prior to grouping two communication entities into the same cluster, may require that an edit distance between the requests of two entities be within a predetermined threshold. In other words, cluster engine 22 may compare the strings that make up the two requests and calculate a corresponding edit (Levenshtein) distance. An edit distance is defined as the minimum number of edits needed to transform one string into another, with the allowable edit operations being insertion, deletion, or substitution of a single character.

Chain engine 24 represents generally any combination of hardware and programming configured to divide each cluster into chains of sequential communication entities excluding communication entities having timing patterns not indicative of polling communications. Thus a given cluster can be divided into a number of chains where those chains do not include all of the communication entities of the cluster. Stated another way, certain entities can be excluded from a chain based on their timing patterns.

A given cluster has a sequence of communication entities each including a request and a corresponding response. An entity's timing pattern can, for example, be determined by comparing the start and end times of that entity (the time of the request and the time of the response) with each other and with their counterparts in adjacent entities of the cluster. Chain engine 24 includes communication entities in a current chain only if their start and end times are indicative of polling communications. Assuming a given communication entity is included in a chain, chain engine 24 repeats the comparison for a subsequent communication entity of the corresponding cluster. If the start and end times of that subsequent entity are not indicative of a polling communication, the entity is excluded and the current chain is stopped. Chain engine 24 then attempts to start a new chain with the next communication entity in the sequence, again comparing the start and end times for that entity. This process continues until all entities of a cluster are examined.

As discussed, polling communications can include regular polling and long polling. Entities cluster will have a timing pattern inactive of a regular polling where requests of adjacent entities in the cluster's sequence are regular and periodic in their timing. The responses are returned within a short time of their corresponding requests. Requests and corresponding responses of adjacent entities are generally uniform in timing. Entities of a cluster will have a timing pattern inactive of long polling where the request of each subsequent entity in the cluster is close and regular in time following the response of the prior entity of that cluster. Thus, for each cluster, chain engine 24 may perform is dividing function by comparing start and end times for communication entities of that cluster and building one or more chains of sequential communication entities that have start and end times that are indicative of polling communications.

Remove engine 28 represents generally any combination of hardware and programming configured to remove clusters from the plurality grouped by cluster engine 22 according to at least one a cluster size, a cluster duration, and a chain analysis. Removal as used here can mean removal from later consideration by identification engine 28. Remove engine 28 may perform this function by examining the clusters and removing clusters containing less than a predefined threshold number of communication entities. Remove engine 28 may remove clusters where the time elapsed between the cluster's first entity and its last is shorter than a predetermined threshold.

Remove engine 28 may also perform its function by examining the chains of each cluster and removing a selected cluster based on that analysis. For example, where the analysis reveals differing communication patterns between the chains of a cluster, the cluster may be removed. Further, where a cluster includes a percentage of communication entities excluded from a chain, and that percentage exceeds a predetermined threshold, the cluster may be removed. In determining such a percentage, remove engine 28 may deem entities of chains containing fewer than a predetermined threshold of entities to be excluded from a chain. In other words, remove engine 28 may ignore chains that are shorter than a predetermined length.

Identification engine 28 represents any combination of hardware and programming configured to identify a remaining cluster as having a polling communication pattern. A remaining cluster is a cluster that remains after remove engine 26 has finished removing a cluster or clusters. Identification engine 28 can identify a remaining cluster by making details of the cluster known to a user or another application. For example, a cluster may be identified as having a polling communication pattern by causing an update of a graphical user interface displaying details of the cluster. The update may call out or otherwise highlight a display of the cluster's communication entities. The highlighting communicates that the corresponding entities have been identified as being part of a polling communication. Identification may also be accomplished by communicating data indicative of the remaining cluster via an email or other network communication.

In foregoing discussion, engines 22-28 were described as combinations of hardware and programming. Such components may be implemented in a number of fashions. Looking at FIG. 3, the programming may be processor executable instructions stored on tangible, non-transitory computer readable medium 30 and the hardware may include processing resource 32 for executing those instructions. Processing resource 32, for example, can include one or multiple processors. Such multiple processors may be integrated in a single device or distributed across devices. Medium 30 can be said to store program instructions that when executed by processor resource 32 implements system 12 of FIG. 2. Medium 30 may be integrated in the same device as processor resource 32 or it may be separate but accessible to that device and processor resource 32.

In one example, the program instructions can be part of an installation package that when installed can be executed by processor resource 32 to implement system 12. In this case, medium 30 may be a portable medium such as a CD, DVD, or flash drive or a memory maintained by a server from which the installation package can be downloaded and installed. In another example, the program instructions may be part of an application or applications already installed. Here, medium 30 can include integrated memory such as a hard drive, solid state drive, or the like.

In FIG. 3, the executable program instructions stored in medium 30 are represented as cluster module 34, chain module 36, remove module 38, and identification module 40 that when executed by processor 34 implement pattern identification system 12 (FIG. 2). Cluster module 34 represents program instructions that when executed function as cluster engine 22. Chain module 36 represents program instructions that when executed implement chain engine 24. Remove module 38 represents program instructions that when executed implement remove engine 26. Identification module 40 represents program instructions that when executed implement identification engine 28.

Operation

Figure 4:
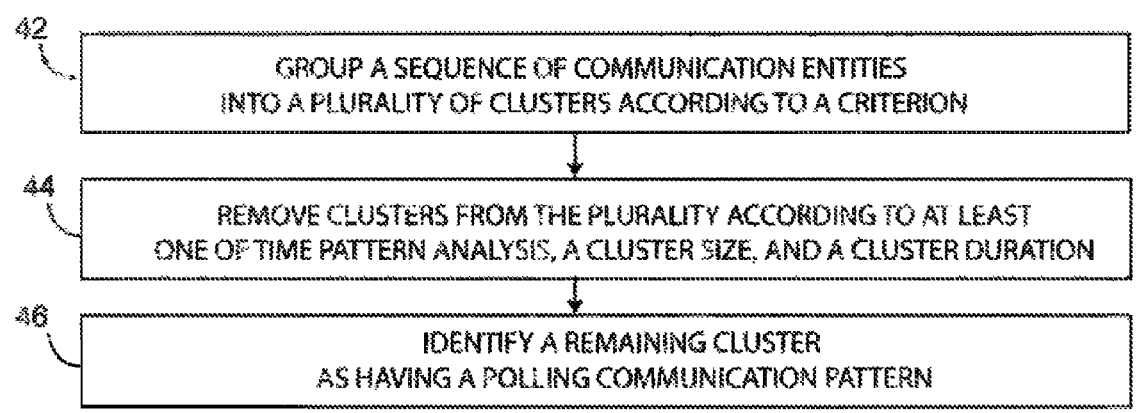
FIG. 4 is a flow diagram depicting steps taken to implement an example.

FIG. 4 is a flow diagram of steps taken to implement a method for identifying polling communications. In discussing FIG. 4, reference may be made to the diagrams of FIGS. 1-3 to provide contextual examples. Implementation, however, is not limited to those examples. In step 42, a sequence of communication entities is grouped into clusters. Referring to FIG. 2, cluster engine 22 may be responsible for implementing step 42. The grouping is performed according to a criterion. For example, step 42 may include grouping communication entities that share at least one of an identical request method, identical request domain, and identical number of request key value pairs into the same cluster.

Grouping in step 42, may also be based on an edit distance between requests. As explained, each communication entity in the sequence includes a request and a corresponding response. An entity of the sequence may be compared with another. Here, the two entities are grouped into the same cluster only if an edit distance between their requests is within a predetermined threshold. Where, for example that threshold is four, two entities are grouped in the same cluster only if four or fewer edits are needed to transform the request of one entity into the request of the other.

Clusters are removed from the plurality established in step 42 according to at least one of a time pattern analysis, cluster size, and cluster duration (step 44). Referring to FIG. 2, remove engine 26 may be responsible for implementing step 44. With respect to cluster size and cluster duration, clusters having less than a threshold number of entities and clusters having a duration shorter than a predetermined threshold duration may be removed. The duration, for example, may be measured from the time of the request or response of the earliest entity of the given cluster and the time of the request or response of the latest entity of that cluster.

For removal based on a time pattern analysis, each cluster may be divided into chains of sequential communication entities that exclude communication entities for which a time pattern analysis indicates are not polling communications. The chains of each cluster can then be examined and a selected cluster can be removed based on that examination. Referring to FIG. 2, chain engine 26 may be responsible for dividing the clusters into chains, and remove engine 28 for examining the chains and removing a cluster based on the examination.

As noted earlier, a given cluster can be divided into a number of chains where those chains do not include all of the communication entities of the cluster. A given cluster has a sequence of communication entities each including a request and a corresponding response. The timing pattern of an entity can, for example, be determined by comparing the start and end times of that entity with each other and with their counterparts in adjacent entities of the cluster. A communication entity is included in a current chain only if the comparison reveals that the start and end times for that entity are indicative of a polling communication. Assuming a communication entity is included in a chain, the comparison is repeated for a subsequent communication entity. If that entity does not have a timing pattern indicative of a polling communication, it is excluded, breaking the current chain. An attempt is then made to start a new chain with the next communication entity in the sequence, again comparing the start and end times for that entity. This process continues until all entities of a cluster are examined.

Once the clusters are divided into chains, the chains can be examined to distinguish clusters that contain differing polling patterns and to distinguish clusters that contains more than a predetermined threshold percentage of communication entities excluded from a chain. Removing, in step 44, can then include removing the distinguished clusters. In an example, entities of chains containing fewer than a predetermined threshold of entities may be deemed as not included in a chain, thus increasing the percentage of excluded entities.

Any remaining cluster—that is, any cluster not removed in step 44—is then identified as having a polling communication pattern (step 46). Referring to FIG. 2, identification engine 30 may be responsible for implementing step 46. Identification in step 46 can include making details of the cluster known to a user or another application. Such may be accomplished by causing a graphical user interface to display information related to the cluster. For example, the user interface displaying the sequence of communication entities may highlight those entities included in the given cluster. Identification may also be accomplished by communicating data inactive of the remaining cluster via an email or other network communication.

Conclusion

FIGS. 1-3 depict the architecture, functionality, and operation of various embodiments, in particular, FIGS. 2-3 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any computer-readable medium for use by or in connection with an instruction execution system such as a computer/processor based system or an ASIC (Application Specific Integrated Circuit) or other system that can fetch or obtain the logic from computer-readable medium and execute the instructions contained therein. "Computer-readable medium" can be any individual medium or distinct media that can contain, store, or maintain a set of instructions and data for use by or in connection with the instruction execution system. A computer readable medium can comprise any one or more of many physical, non-transitory media such as, for example, electronic, magnetic, optical, electromagnetic, or semiconductor media. More specific examples of a computer-readable medium include, but are not limited to, a portable magnetic computer diskette such as floppy diskettes, hard drives, solid state drives, random access memory (RAM), read-only memory (ROM), erasable programmable read-only memory, flash drives, and portable compact discs.

Although the flow diagram of FIG. 4 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for identifying a polling communication pattern within a sequence of communication entities, comprising:
   grouping the communication entities that share at least one of an identical request method, identical request domain, or identical number of request key value pairs into a cluster of a plurality of clusters, each of the communication entities being a request and a corresponding response pair exchanged between a client device and a server device;
   removing at least one of the clusters from the plurality of clusters according to at least one of a time pattern analysis, a cluster size, or a cluster duration;
   identifying remaining clusters of the plurality of clusters as having a polling communication pattern within the sequence of communication entities; and
   outputting an indication that the remaining clusters have a polling communication pattern within the sequence of communication entities.

2. The method of claim 1, wherein grouping comprises:
   comparing a first communication entity of the plurality of communication entities with a second communication entity of the plurality of entities; and
   grouping the first and second communication entities in the same cluster in response to an edit distance between a request of the first communication entity and a request of the second communication entity being within a predetermined threshold.

3. The method of claim 2, wherein the request of the first communication entity and the request of the second communication entity each comprise strings, and wherein the edit distance between the request of the first communication entity and the request of the second communication entity is a number of edits needed to transform the string of the request of the first communication entity into the string of the request of the second communication entity.

4. The method of claim 1, wherein removing at least one of the clusters from the plurality of clusters further comprises removing at least one of the clusters according to a time pattern analysis by:
   for each cluster, dividing that cluster into chains of sequential communication entities that exclude communication entities for which the time pattern analysis indicates are not polling communications;
   examining the chains of each cluster; and
   removing at least one of the clusters according to the examination.

5. The method of claim 4, wherein:
   examining comprises distinguishing at least one of a cluster that contains chains of differing polling communication patterns or a cluster that contains less than a predetermined threshold percentage of communication entities included in a chain; and
   removing comprises removing a distinguished cluster.

6. The method of claim 1, wherein outputting the indication further comprises updating a graphical user interface displaying details of the plurality of clusters to highlight the communication entities in the remaining clusters.

7. The method of claim 1, further comprising:
   using a determination that the remaining clusters have the polling communication pattern to help ensure that a load testing script is properly emulating desired polling communication patterns.

8. A non-transitory computer readable medium having instructions stored thereon that when executed by a processing resource implement a system comprising a cluster engine, a chain engine, a remove engine; and an identification engine, wherein:
   the cluster engine is to group a plurality of communication entities that share at least one of an identical request method, identical request domain, or identical number of request key value pairs into respective clusters of a plurality of clusters, each of the communication entities representing a request and a corresponding response pair exchanged between a client device and a server device;
   the chain engine is to divide each of the plurality of clusters into chains of sequential communication entities excluding communication entities having timing patterns not indicative of polling communications;
   the remove engine is to remove at least one of the clusters from the plurality of clusters according to at least one a cluster size, a cluster duration or a chain analysis; and
   the identification engine is to identify a remaining cluster as having a polling communication pattern and to output an indication that the remaining clusters have a polling communication pattern within the sequence of communication entities.

9. The non-transitory medium of claim 8, wherein the cluster engine is to group by:
   comparing a first communication entity of the plurality of communication entities with a second communication entity of the plurality of entities; and
   grouping the first and second communication entities in the same cluster in response to an edit distance between a request of the first communication entity and a request of the second communication entity being within a predetermined threshold.

10. The non-transitory medium of claim 9, wherein the request of the first communication entity and the request of the second communication entity each comprise strings, and wherein the edit distance between the request of the first communication entity and the request of the second communication entity is a number of edits needed to transform the string of the request of the first communication entity into the string of the request of the second communication entity.

11. The non-transitory medium of claim 8, wherein each cluster includes a sequence of communication entities and wherein:
   for each cluster, the chain engine is to divide by comparing start and end times for the communication entities of that cluster, and building one or more chains of sequential communication entities that have start and end times that are indicative of polling communications;

the remove engine is to examine the chains of each cluster and to remove a selected cluster based on the examination.

12. The non-transitory medium of claim 1, wherein the remove engine is to remove a selected cluster where the examination for that cluster reveals at least one of:
   that the selected cluster contains chains of differing polling communication patterns; and
   the selected cluster contains more than a predetermined threshold percentage of communication entities excluded from a chain.

13. The non-transitory medium of claim 8, wherein the identification engine is to output the indication through an update of a graphical user interface that displays details of the plurality of clusters to highlight the communication entities in the remaining clusters.

14. The non-transitory medium of claim 8, wherein the instructions are further to cause the processing resource implement to:
   use a determination that the remaining clusters have the polling communication pattern to help ensure that a load testing script is properly emulating desired polling communication patterns.

15. A system for identifying a polling communication pattern, the system comprising a processing resource in communication with a non-transitory computer readable medium, wherein the non-transitory computer readable medium contains a set of instructions and wherein the processing resource is to carry out the set of instructions to:
   group the plurality of communication entities that share at least one of an identical request method, identical request domain, or identical number of request key value pairs into respective clusters of a plurality of clusters each of the communication entities being a request and a corresponding response pair exchanged between a client device and a server device;
   remove at least one of the clusters from the plurality of clusters according to at least one of a time pattern analysis, a cluster size, or a cluster duration;
   identify remaining clusters as having a polling communication pattern; and
   output an indication that the remaining clusters have a polling communication pattern within the sequence of communication entities.

16. The system of claim 15, wherein the set of instructions includes instructions to cause the processing resource to group the plurality of communication entities into a plurality of clusters by:
   comparing a first communication entity of the plurality of communication entities with a second communication entity of the plurality of entities; and
   grouping the first and second communication entities in the same cluster in response to an edit distance between a request of the first communication entity and a request of the second communication entity being within a predetermined threshold.

17. The system of claim 16, wherein the request of the first communication entity and the request of the second communication entity each comprise strings, and wherein the edit distance between the request of the first communication entity and the request of the second communication entity is a number of edits needed to transform the string of the request of the first communication entity into the string of the request of the second communication entity.

18. The system of claim 15, wherein the set of instructions include instructions to cause the processor resource to remove at least one of the clusters from the plurality of clusters by:
   dividing each of the plurality of clusters into chains of sequential communication entities according to a time pattern analysis of the communication entities; and
   examining the chains of each cluster and removing a selected cluster according to the examination.

19. The system of claim 15, wherein each cluster includes a sequence of communication entities and wherein the set of instructions includes instructions to cause the processing resource to remove clusters by:
   for each cluster, comparing start and end times for each communication entity of that cluster and identifying one or more chains of sequential communication entities that have start and end times that are indicative of a polling communication;
   examining the chains to select clusters that contain chains of differing polling communication patterns or clusters that contain more than a predetermined threshold percentage of communication entities excluded from a chain; and
   removing the selected clusters.

20. The system of claim 15, wherein the identification engine is to output the indication through an update of a graphical user interface that displays details of the plurality of clusters to highlight the communication entities in the remaining clusters.

* * * * *